F. W. SPERR, Jr., AND M. DARRIN.
APPARATUS FOR POLYMERIZING LIQUIDS BY MEANS OF HEAT AND PRESSURE.
APPLICATION FILED AUG. 22, 1918.

1,314,613.

Patented Sept. 2, 1919.

WITNESSES:

INVENTORS.
Frederick W. Sperr, Jr.
Marc Darrin
BY
Bakewell, Byrnes & Parmelee
ATTORNEYS.

UNITED STATES PATENT OFFICE.

FREDERICK WILLIAM SPERR, JR., OF PITTSBURGH, AND MARC DARRIN, OF WILKINSBURG, PENNSYLVANIA, ASSIGNORS TO THE KOPPERS COMPANY, OF PITTSBURGH, PENNSYLVANIA, A CORPORATION OF PENNSYLVANIA.

APPARATUS FOR POLYMERIZING LIQUIDS BY MEANS OF HEAT AND PRESSURE.

1,314,613.        Specification of Letters Patent.        Patented Sept. 2, 1919.

Application filed August 22, 1918. Serial No. 250,933.

*To all whom it may concern:*

Be it known that we, FREDERICK WILLIAM SPERR, Jr., and MARC DARRIN, citizens of the United States, residing at Pittsburgh and Wilkinsburg, respectively, both in the county of Allegheny and State of Pennsylvania, have invented a new and useful Apparatus for Polymerizing Liquids by Means of Heat and Pressure; and we do hereby declare that the following is a full, clear, and exact description of the same, which will enable others skilled in the art to which it appertains to make use of the same, reference being had to the accompanying drawing, and to the letters of reference marked thereon, which form part of this specification.

This invention relates to the polymerization of liquids by means of heat and pressure, particularly in the liquid phase, and is an improvement on the ordinary autoclave process and apparatus as hereinafter described.

Heretofore, the autoclave process has been carried out by heating the liquid, in a closed boiler, to the desired temperature, the pressure being produced by the heated vapors of the liquid being used. This process is not only intermittent in nature, but the relation of the temperature to the pressure is fixed by the properties of the liquid being treated. Thus, for example, if a liquid similar to water is being treated at a pressure of 150 pounds per square inch, the temperature would be 185° C. This pressure cannot be increased without raising the temperature, which, in the case of certain substances, would be detrimental because of decomposition of the material being treated, or the like. In order to overcome the above objections, it has been proposed, in U. S. Letters Patent No. 342,565, to replace the autoclave boiler with a heated pipe coil, the pressure being maintained by some form of pump, and the heated material being continuously discharged. Heretofore, this type of autoclave has not proved commercially successful due to carbonization and deposits within the coils, and difficulty of temperature control.

By improving the design and method of operation, we have overcome the objection existing in other types of autoclaves, combining the flexible pressure control feature of the continuous type, and the non-carbonizing and even temperature control of the intermittent or boiler type.

Figure 1:
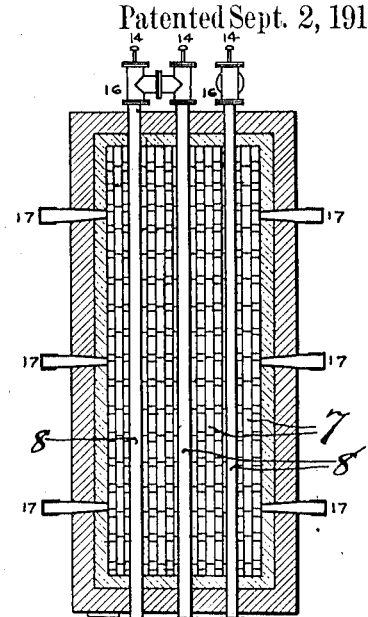
Figure 1:
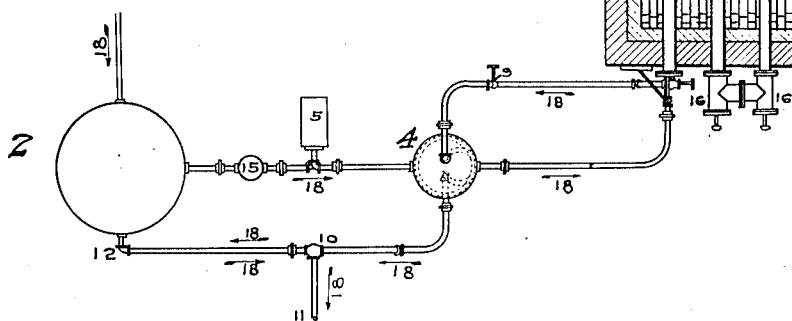
Figure 2:
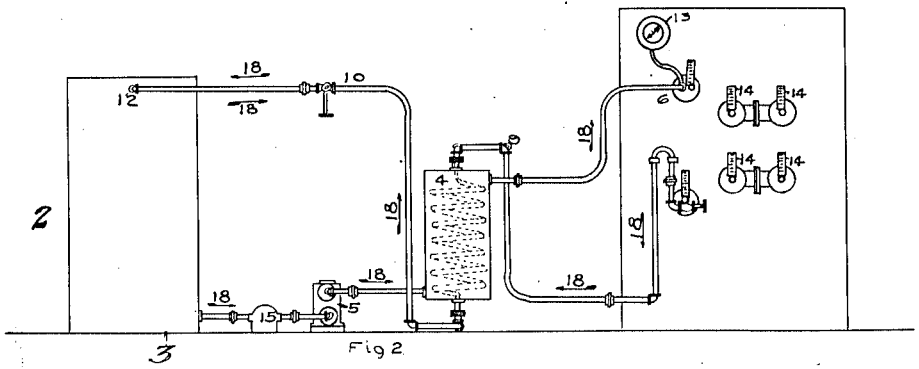

Having stated the nature and object of our invention, we will now proceed to describe it more particularly with reference to the accompanying drawing which forms a part of this specification. In this drawing, Figure 1 is a horizontal sectional plan, and Fig. 2, a front elevation of our improved continuous autoclave and attachments.

The apparatus consists essentially of a series of pipes 8, set in brick checker-work, for purpose of even temperature control, within the furnace 7, heated by means of gas burners 17. The desired pressure within the apparatus is maintained by means of a pump 5, which withdraws the liquid from circulating tank 2, at a point near the bottom 3, through a meter 15. The pump discharges through the "liquid to liquid" heat exchanger 4. The cold liquid from 2 absorbs the heat from the hot material and leaves the autoclave through the hydraulic relief or regulating valve 9, passing through the coil in the heat exchanger, counter to the flow of the entering liquid. The preheated liquid, leaving the heat exchanger, then enters the autoclave tubes at point 6 and flows through the autoclave and attachments in the directions indicated by the arrows 18. It is preferable for the purpose of controlling the temperature to install a recording pressure gage near the point of entrance to the autoclave tubes as at 13. For control of the temperature of the liquid being treated in the autoclave, thermometers should be installed at several points as at 14. For the purpose of cleaning out the tubes of the autoclave, the apparatus should have a slight slope, also the ends of the tubes should be supplied with removable flanges opening the full width of the tubes, so that the tubes are easily accessible for brushing out, as at 16. All flange connections between the various tubes of the autoclave are made on the outside of the furnace, for purpose of ready access for cleaning and repairs. This construction also affords greater structural simplicity and mechanical strength.

In operating the apparatus, the liquid leaving the autoclave passes through the heat exchanger 4, becoming cooled, and from thence flows through the three-way cock 10 to a receiving tank (not shown), by means of pipe 11. In order to obtain sufficiently high velocity and even temperature control throughout the apparatus, it is found advisable at first to recirculate the material back to the top of the feed tank 2 at a point 12, by means of three-way cock 10. When the liquid in 2 has reached the proper degree of polymerization, the delivery can then be changed to pipe 11 by means of the three-way cock 10. This method of operation has been found exceedingly important to prevent carbonization or deposit of sediment within the tubes 8. The velocity of the flow of the material through the system is indicated by means of a meter 15, and for a double extra strong 4″ steel pipe should be about 30 gal. per hour. In the construction of the furnace 7, it is very essential that the pipes be entirely surrounded with checker work in order to afford a uniform heat distribution.

With the arrangement of apparatus and method of procedure as above outlined, we have found it possible to treat liquids which would quickly decompose or deposit sediment or be discolored or otherwise injured, by an ordinary autoclave treatment. It should also be noted that the method of construction of the autoclave furnace is greatly simplified and structurally improved since all heated portions are straight lengths of extra heavy steel pipe, with all connections and flanges just outside the furnace walls. The extension of these connections beyond the walls of the furnace does not appreciably affect or disturb the uniform temperature condition within the tubes, due principally to the high linear velocity of the liquid being treated.

From the foregoing description and mode of operating the invention, it will be clearly seen that we have devised an apparatus particularly suitable for polymerizing such liquids as crude solvent naphtha by means of heat and pressure as described in U. S. Patent No. 1,263,813 on manufacture of resins. It can further be clearly seen that we have devised an apparatus which can be easily and quickly cleaned or repaired, and that we have perfected an apparatus in which all the points set out in the statement of our invention are fully attained and carried out. Various changes may be made in the details of our invention, and it will be obvious to those skilled in the art that same may be modified in several ways without changing the operation of the apparatus or departing from our invention.

Having thus fully described our invention, what we claim as new and desire to secure by Letters Patent is as follows:

1. A continuous autoclave comprising pipes set within a checker-work furnace.

2. A continuous autoclave comprising pipes set within a gas fired furnace, filled with brick checker-work.

3. A continuous autoclave comprising straight steel pipes set within a gas fired furnace filled with brick checker-work, the connections between the pipes being made beyond the outer walls of the furnace.

4. An apparatus for polymerizing liquids by means of heat and pressure, comprising a continuous autoclave and circulating apparatus connected to the inlet and outlet of the autoclave including a pressure pump, and a reservoir.

5. An apparatus for polymerizing liquids by means of heat and pressure, comprising the combination of a continuous autoclave, and a circulating system therefor comprising a pressure pump, and a liquid-to-liquid heat exchanger.

6. An apparatus for polymerizing liquids by means of heat and pressure, comprising the combination of a continuous autoclave, and a recirculating apparatus which includes a pressure pump, a relief valve, a reservoir, and a liquid-to-liquid heat exchanger.

7. An apparatus for polymerizing liquids by means of heat and pressure, comprising a liquid-to-liquid heat exchanger, a reservoir, a high pressure pump, a relief valve, and a substantially continuous autoclave, said autoclave being formed by straight steel pipes passing through a gas fired furnace filled with checker brick, the connections between the different pipes being made on the outside of the furnace, and openings being provided on the outside of the furnace for cleaning the pipes.

8. An autoclave for polymerizing liquids by means of heat and pressure, consisting of substantially straight steel pipes, set within a gas fired furnace, filled with brick checker-work, the ends and the connections between the respective pipes being beyond the outer walls of the furnace.

9. An apparatus for polymerizing substances contained in crude solvent naphtha by means of heat and pressure, consisting of a high pressure pump, a relief valve, an oil-to-oil heat exchanger, and a substantially continuous autoclave, said autoclave being formed by heavy steel pipes set within a gas fired furnace filled with brick checker work, the ends and connections between the pipes being outside the furnace walls, and provision being made without the furnace walls for cleaning the autoclave pipes.

10. Apparatus for polymerizing liquids by means of heat and pressure, comprising an autoclave consisting of a plurality of substantially straight pipes set in a checkerwork furnace, a pump for circulating liquid through the autoclave and for maintaining the desired pressure therein, and a liquid-to-liquid heat exchanger through which the ingoing and outgoing liquid passes.

11. In apparatus for polymerizing liquids by means of heat and pressure, the combination with an autoclave comprising a checkerwork furnace and a plurality of pipes set therein, of a pump for circulating liquid through the autoclave and for maintaining pressure therein, a heat exchanger through which the pump is connected to the autoclave pipes and through which the outlet from said pipes passes, a reservoir, and means whereby the outcoming liquid after passing through the heat exchanger may either be discharged or may be passed back to the reservoir for recirculation, substantially as described.

In testimony whereof, we have hereunto set our hands.

FREDERICK WILLIAM SPERR, Jr.
MARC DARRIN.